US010529335B2

(12) United States Patent
Nichols et al.

(10) Patent No.: US 10,529,335 B2
(45) Date of Patent: Jan. 7, 2020

(54) AUTO-COMPLETE METHODS FOR SPOKEN COMPLETE VALUE ENTRIES

(71) Applicant: Hand Held Products, Inc., Fort Mill, SC (US)

(72) Inventors: Matthew Nichols, Pittsburgh, PA (US); Alexander Nikolaus Mracna, Seven Fields, PA (US); Kurt Charles Miller, Trafford, PA (US); Russell Evans, Pittsburgh, PA (US); Bernard Kriley, Butler, PA (US); Luke Sadecky, New Kensington, PA (US); Brian Manuel, Leechburg, PA (US); Navaneetha Myaka, Pittsburgh, PA (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 0 days.

(21) Appl. No.: 16/379,285

(22) Filed: Apr. 9, 2019

(65) Prior Publication Data
US 2019/0237077 A1 Aug. 1, 2019

Related U.S. Application Data

(63) Continuation of application No. 15/233,992, filed on Aug. 11, 2016, now Pat. No. 10,410,629.
(Continued)

(51) Int. Cl.
*G10L 15/22* (2006.01)
*G06F 17/27* (2006.01)

(52) U.S. Cl.
CPC ............ *G10L 15/22* (2013.01); *G06F 17/276* (2013.01)

(58) Field of Classification Search
USPC ...................................... 704/1–504
See application file for complete search history.

(56) References Cited

U.S. PATENT DOCUMENTS 4,156,868 A * 5/1979 Levinson .............. G10L 15/193
704/251
4,566,065 A 1/1986 Toth
(Continued)

FOREIGN PATENT DOCUMENTS

WO 2013/163789 A1 11/2013
WO 2013/173985 A1 11/2013
(Continued)

OTHER PUBLICATIONS

U.S. Appl. No. 29/530,600 for Cyclone filed Jun. 18, 2015 (Vargo et al); 16 pages.
(Continued)

*Primary Examiner* — Marcus T Riley
(74) *Attorney, Agent, or Firm* — Alston & Bird LLP

(57) ABSTRACT

An auto-complete method for a spoken complete value entry is provided. A processor receives a possible complete value entry having a unique subset, prompts a user to speak the spoken complete value entry, receives a spoken subset of the spoken complete value entry, compares the spoken subset with the unique subset of the possible complete value entry, and automatically completes the spoken complete value entry to match the possible complete value entry if the unique subset matches the spoken subset. The spoken subset has a predetermined minimum number of characters.

20 Claims, 4 Drawing Sheets

Related U.S. Application Data

(60) Provisional application No. 62/206,884, filed on Aug. 19, 2015.

(56) References Cited

U.S. PATENT DOCUMENTS

| | | | |
|---|---|---|---|
| 4,947,438 A * | | 8/1990 | Paeseler ............... G10L 15/193 704/252 |
| 5,956,678 A * | | 9/1999 | Hab-Umbach ......... G10L 15/08 704/241 |
| 6,832,725 B2 | | 12/2004 | Gardiner et al. |
| 7,128,266 B2 | | 10/2006 | Zhu et al. |
| 7,159,783 B2 | | 1/2007 | Walczyk et al. |
| 7,185,271 B2 * | | 2/2007 | Lee ..................... G06F 16/95 715/226 |
| 7,413,127 B2 | | 8/2008 | Ehrhart et al. |
| 7,460,995 B2 * | | 12/2008 | Rinscheid ........... G06F 17/2715 704/231 |
| 7,505,906 B2 * | | 3/2009 | Lewis ..................... G10L 15/18 704/246 |
| 7,657,423 B1 | | 2/2010 | Harik et al. |
| 7,726,575 B2 | | 6/2010 | Wang et al. |
| 7,904,298 B2 * | | 3/2011 | Rao ..................... G10L 15/22 704/243 |
| 8,019,602 B2 * | | 9/2011 | Yu ...................... G10L 15/065 704/231 |
| 8,294,969 B2 | | 10/2012 | Plesko |
| 8,317,105 B2 | | 11/2012 | Kotlarsky et al. |
| 8,322,622 B2 | | 12/2012 | Liu |
| 8,366,005 B2 | | 2/2013 | Kotlarsky et al. |
| 8,371,507 B2 | | 2/2013 | Haggerty et al. |
| 8,376,233 B2 | | 2/2013 | Horn et al. |
| 8,381,979 B2 | | 2/2013 | Franz |
| 8,390,909 B2 | | 3/2013 | Plesko |
| 8,408,464 B2 | | 4/2013 | Zhu et al. |
| 8,408,468 B2 | | 4/2013 | Van et al. |
| 8,408,469 B2 | | 4/2013 | Good |
| 8,423,363 B2 * | | 4/2013 | Gupta .................. G10L 15/22 704/231 |
| 8,424,768 B2 | | 4/2013 | Rueblinger et al. |
| 8,448,863 B2 | | 5/2013 | Xian et al. |
| 8,457,013 B2 | | 6/2013 | Essinger et al. |
| 8,459,557 B2 | | 6/2013 | Havens et al. |
| 8,469,272 B2 | | 6/2013 | Kearney |
| 8,474,712 B2 | | 7/2013 | Kearney et al. |
| 8,479,992 B2 | | 7/2013 | Kotlarsky et al. |
| 8,490,877 B2 | | 7/2013 | Kearney |
| 8,517,271 B2 | | 8/2013 | Kotlarsky et al. |
| 8,521,526 B1 * | | 8/2013 | Lloyd .................. G10L 15/197 704/236 |
| 8,523,076 B2 | | 9/2013 | Good |
| 8,528,818 B2 | | 9/2013 | Ehrhart et al. |
| 8,544,737 B2 | | 10/2013 | Gomez et al. |
| 8,548,420 B2 | | 10/2013 | Grunow et al. |
| 8,550,335 B2 | | 10/2013 | Samek et al. |
| 8,550,354 B2 | | 10/2013 | Gannon et al. |
| 8,550,357 B2 | | 10/2013 | Kearney |
| 8,556,174 B2 | | 10/2013 | Kosecki et al. |
| 8,556,176 B2 | | 10/2013 | Van et al. |
| 8,556,177 B2 | | 10/2013 | Hussey et al. |
| 8,559,767 B2 | | 10/2013 | Barber et al. |
| 8,561,895 B2 | | 10/2013 | Gomez et al. |
| 8,561,903 B2 | | 10/2013 | Sauerwein, Jr. |
| 8,561,905 B2 | | 10/2013 | Edmonds et al. |
| 8,565,107 B2 | | 10/2013 | Pease et al. |
| 8,571,307 B2 | | 10/2013 | Li et al. |
| 8,579,200 B2 | | 11/2013 | Samek et al. |
| 8,583,924 B2 | | 11/2013 | Caballero et al. |
| 8,584,945 B2 | | 11/2013 | Wang et al. |
| 8,587,595 B2 | | 11/2013 | Wang |
| 8,587,697 B2 | | 11/2013 | Hussey et al. |
| 8,588,869 B2 | | 11/2013 | Sauerwein et al. |
| 8,590,789 B2 | | 11/2013 | Nahill et al. |
| 8,596,539 B2 | | 12/2013 | Havens et al. |
| 8,596,542 B2 | | 12/2013 | Havens et al. |
| 8,596,543 B2 | | 12/2013 | Havens et al. |
| 8,599,271 B2 | | 12/2013 | Havens et al. |
| 8,599,957 B2 | | 12/2013 | Peake et al. |
| 8,600,158 B2 | | 12/2013 | Li et al. |
| 8,600,167 B2 | | 12/2013 | Showering |
| 8,602,309 B2 | | 12/2013 | Longacre et al. |
| 8,606,585 B2 * | | 12/2013 | Melamed ................ G10L 15/26 700/94 |
| 8,608,053 B2 | | 12/2013 | Meier et al. |
| 8,608,071 B2 | | 12/2013 | Liu et al. |
| 8,611,309 B2 | | 12/2013 | Wang et al. |
| 8,615,487 B2 | | 12/2013 | Gomez et al. |
| 8,621,123 B2 | | 12/2013 | Caballero |
| 8,622,303 B2 | | 1/2014 | Meier et al. |
| 8,628,013 B2 | | 1/2014 | Ding |
| 8,628,015 B2 | | 1/2014 | Wang et al. |
| 8,628,016 B2 | | 1/2014 | Winegar |
| 8,629,926 B2 | | 1/2014 | Wang |
| 8,630,491 B2 | | 1/2014 | Longacre et al. |
| 8,635,309 B2 | | 1/2014 | Berthiaume et al. |
| 8,636,200 B2 | | 1/2014 | Kearney |
| 8,636,212 B2 | | 1/2014 | Nahill et al. |
| 8,636,215 B2 | | 1/2014 | Ding et al. |
| 8,636,224 B2 | | 1/2014 | Wang |
| 8,638,806 B2 | | 1/2014 | Wang et al. |
| 8,640,958 B2 | | 2/2014 | Lu et al. |
| 8,640,960 B2 | | 2/2014 | Wang et al. |
| 8,643,717 B2 | | 2/2014 | Li et al. |
| 8,645,825 B1 | | 2/2014 | Cornea et al. |
| 8,646,692 B2 | | 2/2014 | Meier et al. |
| 8,646,694 B2 | | 2/2014 | Wang et al. |
| 8,657,200 B2 | | 2/2014 | Ren et al. |
| 8,659,397 B2 | | 2/2014 | Vargo et al. |
| 8,668,149 B2 | | 3/2014 | Good |
| 8,678,285 B2 | | 3/2014 | Kearney |
| 8,678,286 B2 | | 3/2014 | Smith et al. |
| 8,682,077 B1 | | 3/2014 | Longacre, Jr. |
| D702,237 S | | 4/2014 | Oberpriller et al. |
| 8,687,282 B2 | | 4/2014 | Feng et al. |
| 8,692,927 B2 | | 4/2014 | Pease et al. |
| 8,695,880 B2 | | 4/2014 | Bremer et al. |
| 8,698,949 B2 | | 4/2014 | Grunow et al. |
| 8,702,000 B2 | | 4/2014 | Barber et al. |
| 8,717,494 B2 | | 5/2014 | Gannon |
| 8,720,783 B2 | | 5/2014 | Biss et al. |
| 8,723,804 B2 | | 5/2014 | Fletcher et al. |
| 8,723,904 B2 | | 5/2014 | Marty et al. |
| 8,727,223 B2 | | 5/2014 | Wang |
| 8,740,082 B2 | | 6/2014 | Wilz, Sr. |
| 8,740,085 B2 | | 6/2014 | Furlong et al. |
| 8,746,563 B2 | | 6/2014 | Hennick et al. |
| 8,750,445 B2 | | 6/2014 | Peake et al. |
| 8,752,766 B2 | | 6/2014 | Xian et al. |
| 8,756,059 B2 | | 6/2014 | Braho et al. |
| 8,757,495 B2 | | 6/2014 | Qu et al. |
| 8,760,563 B2 | | 6/2014 | Koziol et al. |
| 8,763,909 B2 | | 7/2014 | Reed et al. |
| 8,777,108 B2 | | 7/2014 | Coyle |
| 8,777,109 B2 | | 7/2014 | Oberpriller et al. |
| 8,779,898 B2 | | 7/2014 | Havens et al. |
| 8,781,520 B2 | | 7/2014 | Payne et al. |
| 8,783,573 B2 | | 7/2014 | Havens et al. |
| 8,789,757 B2 | | 7/2014 | Barten |
| 8,789,758 B2 | | 7/2014 | Hawley et al. |
| 8,789,759 B2 | | 7/2014 | Xian et al. |
| 8,794,520 B2 | | 8/2014 | Wang et al. |
| 8,794,522 B2 | | 8/2014 | Ehrhart |
| 8,794,525 B2 | | 8/2014 | Amundsen et al. |
| 8,794,526 B2 | | 8/2014 | Wang et al. |
| 8,798,367 B2 | | 8/2014 | Ellis |
| 8,807,431 B2 | | 8/2014 | Wang et al. |
| 8,807,432 B2 | | 8/2014 | Van et al. |
| 8,820,630 B2 | | 9/2014 | Qu et al. |
| 8,822,848 B2 | | 9/2014 | Meagher |
| 8,824,692 B2 | | 9/2014 | Sheerin et al. |
| 8,824,696 B2 | | 9/2014 | Braho |
| 8,842,849 B2 | | 9/2014 | Wahl et al. |
| 8,844,822 B2 | | 9/2014 | Kotlarsky et al. |
| 8,844,823 B2 | | 9/2014 | Fritz et al. |

(56) References Cited

U.S. PATENT DOCUMENTS

| | | |
|---|---|---|
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue et al. |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein, Jr. |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | El et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber et al. |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,080,856 B2 * | 7/2015 | Laffargue ............... H04N 13/20 |
| 9,082,023 B2 | 7/2015 | Feng et al. |
| 9,084,032 B2 * | 7/2015 | Rautiola ........... H04L 29/12311 |
| 9,224,022 B2 | 12/2015 | Ackley et al. |
| 9,224,027 B2 | 12/2015 | Van et al. |
| D747,321 S | 1/2016 | London et al. |
| 9,230,140 B1 | 1/2016 | Ackley |
| 9,250,712 B1 | 2/2016 | Todeschini |
| 9,258,033 B2 | 2/2016 | Showering |
| 9,262,403 B2 * | 2/2016 | Christ ................... G06F 17/276 |
| 9,262,633 B1 | 2/2016 | Todeschini et al. |
| 9,310,609 B2 | 4/2016 | Rueblinger et al. |
| 9,317,605 B1 * | 4/2016 | Zivkovic ............... G06F 16/951 |
| D757,009 S | 5/2016 | Oberpriller et al. |
| 9,342,724 B2 | 5/2016 | McCloskey et al. |
| 9,375,945 B1 | 6/2016 | Bowles |
| D760,719 S | 7/2016 | Zhou et al. |
| 9,390,596 B1 | 7/2016 | Todeschini |
| D762,604 S | 8/2016 | Fitch et al. |
| D762,647 S | 8/2016 | Fitch et al. |
| 9,412,242 B2 | 8/2016 | Van et al. |
| D766,244 S | 9/2016 | Zhou et al. |
| 9,443,123 B2 | 9/2016 | Hejl |
| 9,443,222 B2 | 9/2016 | Singel et al. |
| 9,478,113 B2 | 10/2016 | Xie et al. |
| 9,640,181 B2 * | 5/2017 | Parkinson ................ G06F 17/24 |
| 9,697,281 B1 * | 7/2017 | Palmon ................. G06F 16/951 |
| 2004/0039988 A1 * | 2/2004 | Lee .......... G06F 16/95 715/226 |
| 2004/0243406 A1 * | 12/2004 | Rinscheid ........... G06F 17/2715 704/231 |
| 2005/0159949 A1 * | 7/2005 | Yu ......................... G10L 15/065 704/235 |
| 2005/0192801 A1 * | 9/2005 | Lewis ..................... G10L 15/18 704/240 |
| 2007/0063048 A1 | 3/2007 | Havens et al. |
| 2007/0208567 A1 * | 9/2007 | Amento .................. G10L 15/22 704/270 |
| 2008/0120102 A1 * | 5/2008 | Rao ........................ G10L 15/22 704/235 |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0179811 A1 * | 7/2010 | Gupta .................... G10L 15/22 704/235 |
| 2010/0265880 A1 * | 10/2010 | Rautiola ........... H04L 29/12311 370/328 |
| 2011/0169999 A1 | 7/2011 | Grunow et al. |
| 2011/0184719 A1 * | 7/2011 | Christ ................... G06F 17/276 704/2 |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |

(56) References Cited

U.S. PATENT DOCUMENTS

| | | |
|---|---|---|
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedrao |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0034734 A1 | 2/2014 | Sauerwein, Jr. |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein, Jr. |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Liu et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0267609 A1* | 9/2014 | Laffargue ............... H04N 13/20 348/46 |
| 2014/0270196 A1 | 9/2014 | Braho et al. |
| 2014/0270229 A1 | 9/2014 | Braho |
| 2014/0278387 A1 | 9/2014 | Digregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |

(56) References Cited

U.S. PATENT DOCUMENTS

| | | |
|---|---|---|
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chen et al. |
| 2015/0169929 A1 | 6/2015 | Williams et al. |
| 2015/0186703 A1 | 7/2015 | Chen et al. |
| 2015/0187355 A1* | 7/2015 | Parkinson ............... G06F 17/24 704/235 |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0109219 A1 | 4/2016 | Ackley et al. |
| 2016/0109220 A1 | 4/2016 | Laffargue et al. |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0125873 A1 | 5/2016 | Braho et al. |
| 2016/0133253 A1 | 5/2016 | Braho et al. |
| 2016/0171720 A1 | 6/2016 | Todeschini |
| 2016/0178479 A1 | 6/2016 | Goldsmith |
| 2016/0180678 A1 | 6/2016 | Ackley et al. |
| 2016/0189087 A1 | 6/2016 | Morton et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Wilz et al. |
| 2016/0314294 A1 | 10/2016 | Kubler et al. |
| 2017/0053647 A1* | 2/2017 | Nichols ................... G10L 15/22 |

FOREIGN PATENT DOCUMENTS

| | | |
|---|---|---|
| WO | 2014/019130 A1 | 2/2014 |
| WO | 2014/110495 A1 | 7/2014 |

OTHER PUBLICATIONS

U.S. Appl. No. 29/529,441 for Indicia Reading Device filed Jun. 8, 2015 (Zhou et al.); 14 pages.
U.S. Appl. No. 29/528,890 for Mobile Computer Housing filed Jun. 2, 2015 (Fitch et al.); 61 pages.
U.S. Appl. No. 29/526,918 Chargine Base filed May 14, 2015 (Fitch et al.); 10 pages.
U.S. Appl. No. 29/525,068 for Tablet Computer With Removable Scanning Device filed Apr. 27, 2015 (Schulte et al.); 19 pages.
U.S. Appl. No. 29/523,098 for Handle for a Tablet Computer filed Apr. 7, 2015 (Bidwell et al.); 17 pages.
U.S. Appl. No. 29/516,892 for Table Computer filed Feb. 6, 2015 (Bidwell et al.); 13 pages.
U.S. Appl. No. 29/468,118 for an Electronic Device Case, filed Sep. 26, 2013 (Oberpriller et al.); 44 pages.
U.S. Appl. No. 14/446,391 for Multifunction Point of Sale Apparatus With Optical Signature Capture filed Jul. 30, 2014 (Good et al.); 37 pages; now abandoned.
U.S. Appl. No. 14/277,337 for Multipurpose Optical Reader, filed May 14, 2014 (Jovanovski et al.); 59 pages; now abandoned.
U.S. Patent Application for Tracking Batiery Conditions filed May 4, 2015 (Young et al.); 70 pages, U.S. Appl. No. 14/702,979.
U.S. Patent Application for Terminal Having Illumination and Focus Control filed May 21, 2014 (Liu et al.); 31 pages; now abandoned, U.S. Appl. No. 14/283,282.
U.S. Patent Application for Tactile Switch for a Mobile Electronic Device filed Jun. 16, 2015 (Bamdringa); 38 pages, U.S. Appl. No. 14/740,320.
U.S. Patent Application for System and Method for Regulating Barcode Data Injection Into a Running Application on a Smart Device filed May 1, 2015 (Todeschini et al.); 38 pages, U.S. Appl. No. 14/702,110.
U.S. Patent Application for Portable Electronic Devices Having a Separate Location Trigger Unit for Use in Controlling an Application Unit filed Nov. 3, 2014, Bian et al., 18 pages, U.S. Appl. No. 14/398,542.
U.S. Patent Application for Optical Pattern Projector filed Jun. 23, 2015 (Thuries et al.); 33 pages, U.S. Appl. No. 14/747,197.
U.S. Patent Application for Method and System to Protect Software-Based Network-Connected Devices From Advanced Persistent Threat filed May 6, 2015 (Hussey et al.); 42 pages, U.S. Appl. No. 14/705,407.
U.S. Patent Application for Intermediate Linear Positioning filed May 5, 2015 (Charpentier et al); 60 pages, U.S. Appl. No. 14/704,050.
U.S. Patent Application for Indicia-Reading Systems Having an Interface With a User'S Nervous System filed Jun. 10, 2015 (Todeschini); 39 pages, U.S. Appl. No. 14/735,717.
U.S. Patent Application for Hands-Free Human Machine Interface Responsive to a Driver of a Vehicle filed May 6, 2015 (Fitch et al.); 44 pages, U.S. Appl. No. 14/705,012.
U.S. Patent Application for Hand-Mounted Indicia-Reading Device With Finger Motion Triggering filed Apr. 1, 2014, Van Horn et al., 29 pages, U.S. Appl. No. 14/231,898.
U.S. Patent Application for Evaluating Image Values filed May 19, 2015 (Ackley); 60 pages, U.S. Appl. No. 14/715,916.
U.S. Patent Application for Dual-Projector Three-Dimensional Scanner filed Jun. 23, 2015 (Jovanovski et al.); 40 pages, U.S. Appl. No. 14/747,490.
U.S. Patent Application for Calibrating a vol. Dimensioner filed Jun. 16, 2015 (Ackley et al.); 63 pages, U.S. Appl. No. 14/740,373.
U.S. Patent Application for Barcode Reader With Security Features filed Oct. 31, 2014, Todeschini et al., 28 pages, U.S. Appl. No. 14/529,857.
U.S. Patent Application for Augumented Reality Enabled Hazard Display filed May 19, 2015 (Venkatesha et al.); 35 pages, U.S. Appl. No. 14/715,672.
U.S. Patent Application for Application Independent DEX/UCS Interface filed May 8, 2015 (Page); 47 pages, U.S. Appl. No. 14/707,123.
U.S. Patent Application for Media Gate for Thermal Transfer Printers filed Dec. 23, 2014, Jason Dean Lewis Bowles, 32 pages, U.S. Appl. No. 14/580,262.
U.S. Appl. No. 13/367,978, filed Feb. 7, 2012, (Feng et al.); now abandoned.
Office Action from U.S. Appl. No. 15/233,992, dated Sep. 19, 2017, 9 pages.
Office Action from U.S. Appl. No. 15/233,992, dated May 18, 2018, 12 pages.
Office Action from U.S. Appl. No. 15/233,992, dated Jul. 25, 2018, 12 pages.
Notice of Allowance from U.S. Appl. No. 15/233,992, dated May 1, 2019, 12 pages.
Examination Report for GB Patent Application No. 1613949.5, dated Dec. 12, 2018, 4 pages.
Combined Search and Examination Report in counterpart GB Application No. 1613949.5 dated Jan. 30, 2017, pp. 1-6.
U.S. Appl. No. 15/233,992, filed Aug. 11, 2016, Pending.
Office Action for British Application No. 1903587.2, dated Aug. 15, 2019, 8 pages.

* cited by examiner

AUTO-COMPLETE METHODS FOR SPOKEN COMPLETE VALUE ENTRIES

CROSS-REFERENCE TO PRIORITY APPLICATION

This application is a continuation of U.S. non-provisional application Ser. No. 15/233,992 for Auto-Complete Methods For Spoken Complete Value Entries filed Aug. 11, 2016, which claims priority to and the benefit of U.S. provisional application Ser. No. 62/2016,884 for Auto-Complete for Spoken Long Values Entry in a Speech Recognition System filed Aug. 19, 2015, each of which is hereby incorporated by reference in its entirety.

FIELD OF THE INVENTION

The present invention relates to auto-complete methods, and more particularly, to auto-complete methods for spoken complete value entries.

BACKGROUND

Voice-enabled systems help users complete assigned tasks. For example, in a workflow process, a voice-enabled system may guide users through a particular task. The task may be at least a portion of the workflow process comprising at least one workflow stage. As a user completes his/her assigned tasks, a bi-directional dialog or communication stream of information is provided over a wireless network between the user wearing a mobile computing device (herein, "mobile device") and a central computer system that is directing multiple users and verifying completion of their tasks. To direct the user's actions, information received by the mobile device from the central computer system is translated into speech or voice instructions for the corresponding user. To receive the voice instructions and transmit information, the user wears a communications headset (also referred to herein as a "headset assembly" or simply a "headset") communicatively coupled to the mobile device.

The user may be prompted for a verbal response during completion of the task. The verbal response may be a string of characters, such as digits and/or letters. The string of characters may correspond, for example, to a credit card number, a telephone number, a serial number, a vehicle identification number, or the like. The spoken string of characters (i.e., the verbal response) may be referred to herein as a "spoken complete value entry".

Unfortunately, speaking the spoken complete value entry is often time-consuming and difficult to speak correctly, especially if the spoken complete value entry is long (i.e., the number of characters in the spoken string of characters is relatively large (referred to herein as a "spoken long value entry"). If errors in speaking the spoken complete value entry are made by the user (i.e., the speaker), conventional systems and methods often require that the user restart the spoken string, causing user frustration and being even more time-consuming.

Therefore, a need exists for auto-complete methods for spoken complete value entries, particularly spoken long value entries, and for use in a workflow process.

SUMMARY

An auto-complete method for a spoken complete value entry is provided, according to various embodiments of the present invention. A processor receives a possible complete value entry having a unique subset, prompts a user to speak the spoken complete value entry, receives a spoken subset of the spoken complete value entry, compares the spoken subset with the unique subset of the possible complete value entry, and automatically completes the spoken complete value entry to match the possible complete value entry if the unique subset matches the spoken subset. The spoken subset has a predetermined minimum number of characters.

An auto-complete method for a spoken complete value entry is provided, according to various embodiments of the present invention. A processor receives one or more possible complete value entries each having a unique subset, prompts a user to speak the spoken complete value entry, receives a spoken subset of the spoken complete value entry, compares the spoken subset with the unique subset of each possible complete value entry as choices, automatically completes the spoken complete value entry to match a possible complete value entry of the one or more possible complete value entries if the spoken subset matches the unique subset of the possible complete value entry, and confirms the automatically completed spoken complete value entry as the spoken complete value entry. The spoken subset has a predetermined minimum number of characters.

An auto-complete method for a spoken complete value entry in a workflow process, according to various embodiments of the present invention. The method comprises receiving, by a processor, a voice assignment to perform the workflow process comprising at least one workflow stage. The processor identifies a task that is to be performed by a user, the task being at least a portion of the workflow process. The processor receives a possible complete value entry having a unique subset and prompts a user to speak the spoken complete value entry. The processor receives a spoken subset of the spoken complete value entry. The spoken subset has a predetermined minimum number of characters. The processor compares the spoken subset with the unique subset of the possible complete value entry and confirms the automatically completed spoken complete value entry as the spoken complete value entry.

The foregoing illustrative summary, as well as other exemplary objectives and/or advantages of the present invention, and the manner in which the same are accomplished, are further explained within the following detailed description and its accompanying drawings.

DETAILED DESCRIPTION

Various embodiments are directed to auto-complete methods for spoken complete value entries. According to various embodiments, the spoken complete value entry that a user intends to speak is predicted after only a predetermined minimum number of characters (a spoken subset) have been spoken by the user. The spoken complete value entry is longer and harder to speak than the spoken subset thereof. Various embodiments speed up human-computer interactions. Various embodiments as described herein are especially useful for spoken long value entries as hereinafter described, and for use in workflow processes, thereby improving workflow efficiencies and easing worker frustration.

As used herein, the "spoken complete value entry" comprises a string of characters. As used herein, the term "string" is any finite sequence of characters (i.e., letters, numerals, symbols and punctuation marks). Each string has a length, which is the number of characters in the string. The length can be any natural number (any positive integer, but excluding zero). For numerals, valid entry values may be 0-9. For letters, valid entry values may be A-Z. Of course, in languages other than English, valid entry values may be different. The number of characters in a spoken complete value entry is greater than the number of characters in the spoken subset thereof as hereinafter described. As noted previously, the number of characters in the string of characters of the spoken complete value entry comprising a spoken long value entry is relatively large. Exemplary spoken complete value entries may be credit card numbers, telephone numbers, serial numbers, vehicle identification numbers, or the like.

Figure 1:
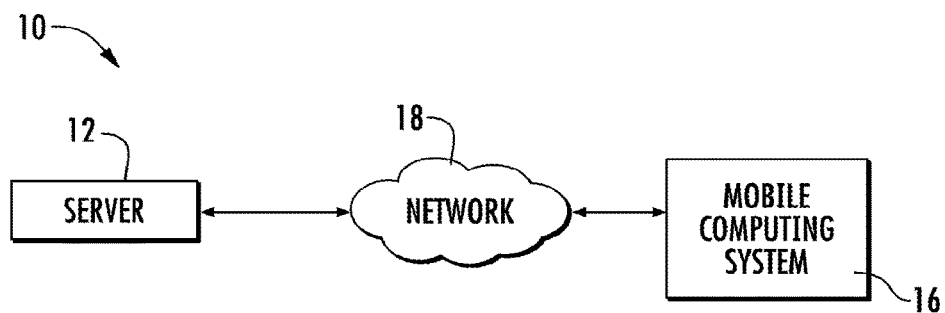
FIG. 1 is a simplified block diagram of a system in which an auto-complete method for spoken complete value entries may be implemented, according to various embodiments.

Referring now to FIG. 1, according to various embodiments, an exemplary system 10 is provided in which an auto-complete method 100 for a spoken complete value entry may be implemented. The exemplary depicted system comprises a server 12 and a mobile computing system 16 that are configured to communicate through at least one communications network 18. The communications network 18 may include any collection of computers or communication devices interconnected by communication channels. The communication channels may be wired or wireless. Examples of such communication networks 18 include, without limitation, local area networks (LAN), the internet, and cellular networks.

Figure 2:
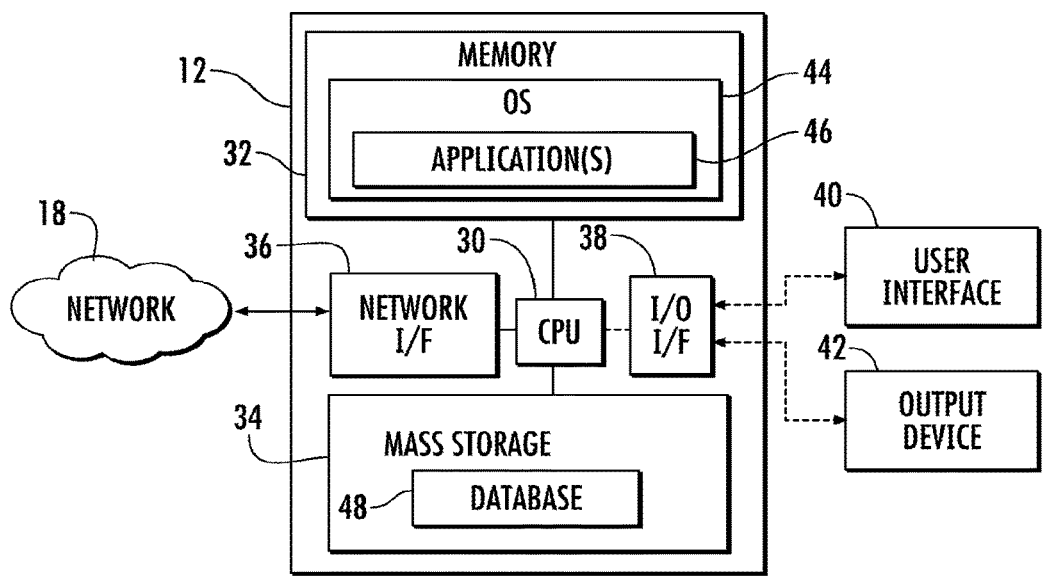
FIG. 2 is a diagrammatic illustration of hardware and software components of an exemplary server of the system of FIG. 1, according to various embodiments.

FIG. 2 is a diagrammatic illustration of the hardware and software components of the server 12 of system 10 according to various embodiments of the present invention. The server 12 may be a computing system, such as a computer, computing device, disk array, or programmable device, including a handheld computing device, a networked device (including a computer in a cluster configuration), a mobile telecommunications device, a video game console (or other gaming system), etc. As such, the server 12 may operate as a multi-user computer or a single-user computer. The server 12 includes at least one central processing unit (CPU) 30 coupled to a memory 32. Each CPU 30 is typically implemented in hardware using circuit logic disposed on one or more physical integrated circuit devices or chips and may be one or more microprocessors, micro-controllers, FPGAs, or ASICs. Memory 32 may include RAM, DRAM, SRAM, flash memory, and/or another digital storage medium, and also typically implemented using circuit logic disposed on one or more physical integrated circuit devices, or chips. As such, memory 32 may be considered to include memory storage physically located elsewhere in the server 12, e.g., any cache memory in the at least one CPU 30, as well as any storage capacity used as a virtual memory, e.g., as stored on a mass storage device 34, another computing system (not shown), a network storage device (e.g., a tape drive) (not shown), or another network device (not shown) coupled to the server 12 through at least one network interface 36 (illustrated and referred to hereinafter as "network I/F" 36) by way of the communications network 18.

The server 12 may optionally (as indicated by dotted lines in FIG. 2) be coupled to at least one peripheral device through an input/output device interface 38 (illustrated as, and hereinafter, "I/O I/F" 38). In particular, the server 12 may receive data from a user through at least one user interface 40 (including, for example, a keyboard, mouse, a microphone, and/or other user interface) and/or outputs data to the user through at least one output device 42 (including, for example, a display, speakers, a printer, and/or another output device). Moreover, in various embodiments, the I/O I/F communicates with a device that is operative as a user interface 40 and output device 42 in combination, such as a touch screen display (not shown).

The server 12 is typically under the control of an operating system 44 and executes or otherwise relies upon various computer software applications, sequences of operations, components, programs, files, objects, modules, etc., according to various embodiments of the present invention. In various embodiments, the server 12 executes or otherwise relies on one or more business logic applications 46 that are configured to provide a task message/task instruction to the mobile computing system 16. The task message/task instruction is communicated to the mobile computing system 16 for a user thereof (such as a warehouse worker) to, for example, execute a task in at least one workflow stage of a workflow process.

Figure 3:
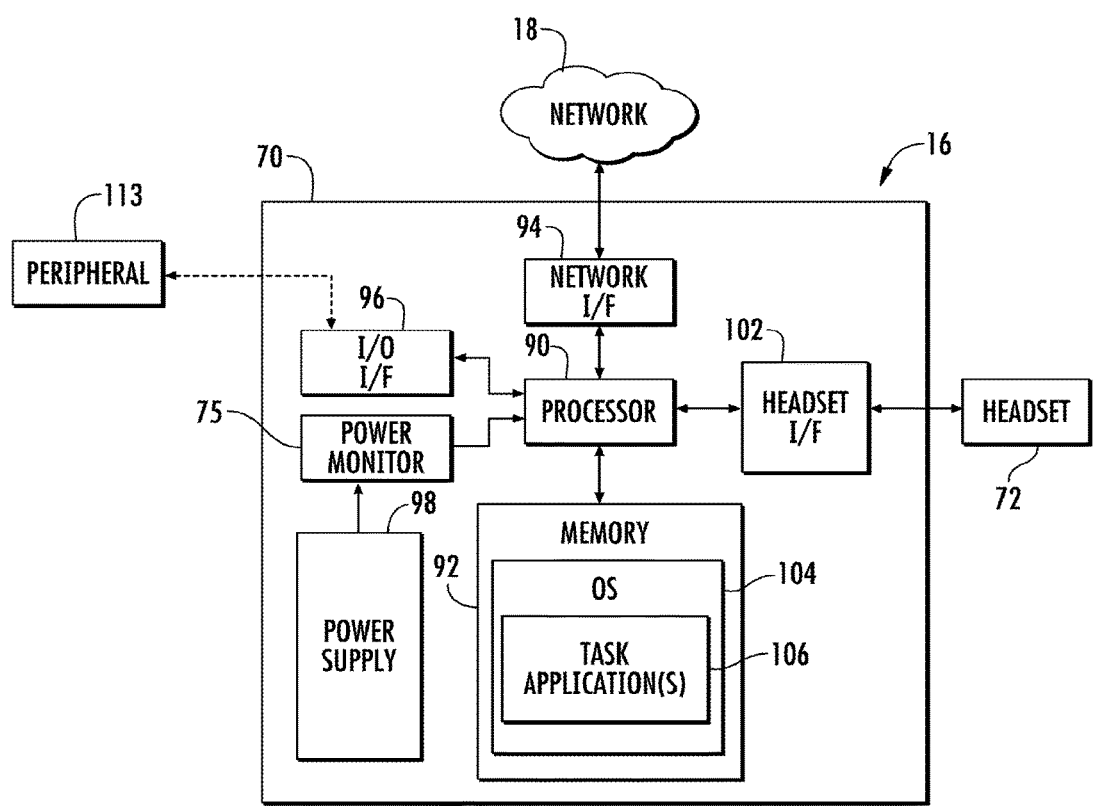
FIG. 3 is an illustration of the mobile computing system of the system of FIG. 1, depicting a mobile computing device and an exemplary headset that may be worn by a user performing a task in a workflow process, according to various embodiments.

Referring now to FIG. 3, according to various embodiments, the mobile computing system comprises a mobile computing device communicatively coupled to a headset. The mobile computing device may comprise a portable and/or wearable mobile computing device 70 worn by a user 76, for example, such as on a belt 78 as illustrated in the depicted embodiment of FIG. 4. In various embodiments, the mobile computing device may be carried or otherwise transported, on a vehicle 74 (FIG. 4) used in the workflow process.

According to various embodiments, FIG. 3 is a diagrammatic illustration of at least a portion of the components of the mobile computing device 70 according to various embodiments. The mobile computing device 70 comprises a memory 92 and a program code resident in the memory 92 and a processor 90 communicatively coupled to the memory 92. The mobile computing device 70 further comprises a power supply 98, such as a battery, rechargeable battery, rectifier, and/or another power source and may comprise a power monitor 75.

The processor 90 of the mobile computing device 70 is typically implemented in hardware using circuit logic disposed in one or more physical integrated circuit devices, or chips. Each processor may be one or more microprocessors, micro-controllers, field programmable gate arrays, or ASICs, while memory may include RAM, DRAM, SRAM, flash memory, and/or another digital storage medium, and that is also typically implemented using circuit logic disposed in one or more physical integrated circuit devices, or chips. As such, memory is considered to include memory storage physically located elsewhere in the mobile computing device, e.g., any cache memory in the at least one processor, as well as any storage capacity used as a virtual memory, e.g., as stored on a mass storage device, a computer, and/or or another device coupled to the mobile computing device, including coupled to the mobile computing device through at least one network I/F 94 by way of the communications network 18. The mobile computing device 70, in turn, couples to the communications network 18 through the network I/F 94 with at least one wired and/or wireless connection.

Figure 4:
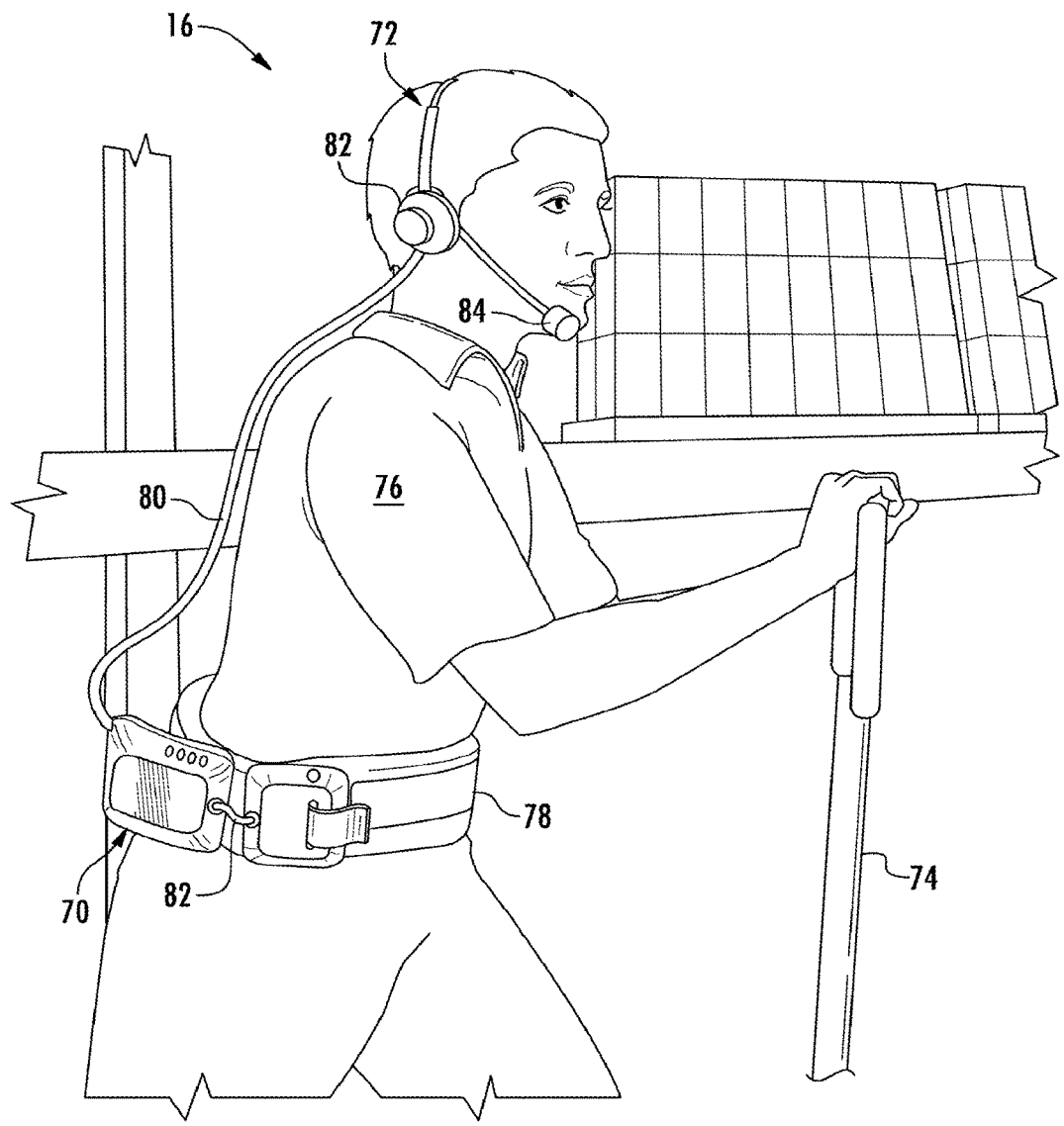
FIG. 4 is a diagrammatic illustration of hardware and software components of the mobile computing device and the headset of FIG. 3, according to various embodiments.

Still referring to FIGS. 3 and 4, according to various embodiments, the mobile computing system 16 may further comprise a user input/output device, such as the headset 72. The headset 72 may be used, for example, in voice-enabled workflow processes. In various embodiments, the user 76 may interface with the mobile computing device 70 (and the mobile computing device interfaces with the user 76) through the headset 72, which may be coupled to the mobile computing device 70 through a cord 80. In various embodiments, the headset 72 is a wireless headset and coupled to the mobile computing device through a wireless signal (not shown). The headset 72 may include one or more speakers 82 and one or more microphones 84. The speaker 82 is configured to play audio (e.g., such as speech output associated with a voice dialog to instruct the user 76 to perform a task, i.e., a "voice assignment"), while the microphone 84 is configured to capture speech input from the user 76 (e.g., such as for conversion to machine readable input). The speech input from the user 76 may comprise a verbal response comprising the spoken complete value entry. As such, and in some embodiments, the user 76 interfaces with the mobile computing device 70 hands-free through the headset 72. The mobile computing device 70 is configured to communicate with the headset 72 through a headset interface 102 (illustrated as, and hereinafter, "headset I/F" 102), which is in turn configured to couple to the headset 72 through the cord 80 and/or wirelessly. For example, the mobile computing device 70 may be coupled to the headset 72 through the BlueTooth® open wireless technology standard that is known in the art.

Referring now specifically to FIG. 3, in various embodiments, the mobile computing device 70 may additionally include at least one input/output interface 96 (illustrated as, and hereinafter, "I/O I/F" 96) configured to communicate with at least one peripheral 113 other than the headset 72. Exemplary peripherals may include a printer, a headset, an image scanner, an identification code reader (e.g., a barcode reader or an RFID reader), a monitor, a user interface (e.g., keyboard, keypad), an output device, a touch screen, to name a few. In various embodiments, the I/O I/F 96 includes at least one peripheral interface, including at least one of one or more serial, universal serial bus (USE), PC Card, VGA, HDMI, DVI, and/or other interfaces (e.g., for example, other computer, communicative, data, audio, and/or visual interfaces) (none shown). In various embodiments, the mobile computing device 70 may be communicatively coupled to the peripheral(s) 110 through a wired or wireless connection such as the BlueTooth® open wireless technology standard that is known in the art.

The mobile computing device 70 may be under the control and/or otherwise rely upon various software applications, components, programs, files, objects, modules, etc. (herein the "program code" that is resident in memory 92) according to various embodiments of the present invention. This program code may include an operating system 104 (e.g., such as a Windows Embedded Compact operating system as distributed by Microsoft Corporation of Redmond, Wash.) as well as one or more software applications (e.g., configured to operate in an operating system or as "stand-alone" applications).

In accordance with various embodiments, the program code may include a prediction software program as hereinafter described. As such, the memory 92 may also be configured with one or more task applications 106. The one or more task applications 106 process messages or task instructions (the "voice assignment") for the user 76 (e.g., by displaying and/or converting the task messages or task instructions into speech output). The one or more task application(s) 106 implement a dialog flow. The task application(s) 106 communicate with the server 12 to receive task messages or task instructions. In turn, the task application(s) 106 may capture speech input for subsequent conversion to a useable digital format (e.g., machine readable input) by application(s) 46 to the server 12 (e.g., to update the database 48 of the server 12). As noted previously, the speech input may be a spoken subset or user confirmation as hereinafter described. In the context of a workflow process, according to various embodiments, the processor of the mobile computing device may receive a voice assignment to perform the workflow process comprising at least one workflow stage. The processor may identify a task that is to be performed by a user, the task being at least a portion of the workflow process.

Figure 5:
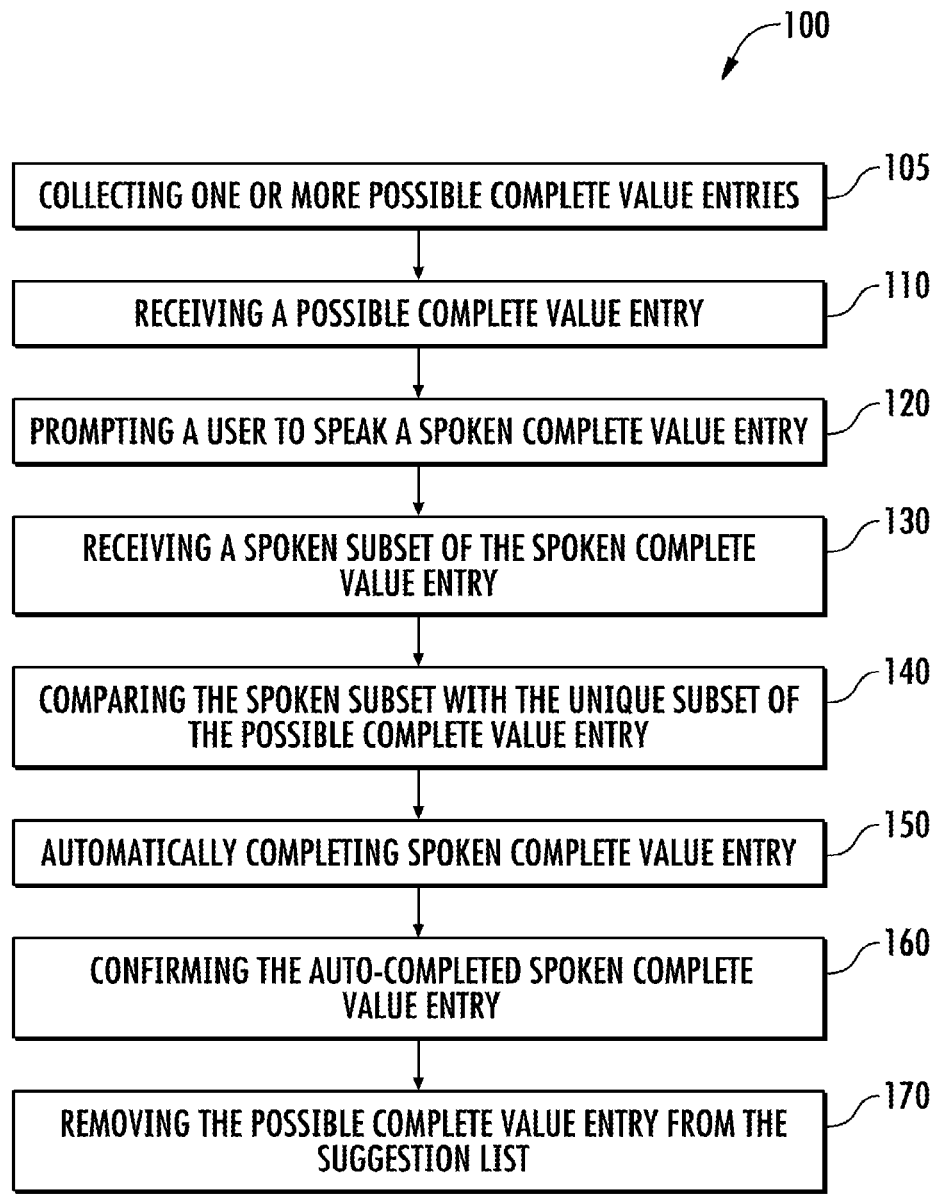
FIG. 5 is a flow diagram of an auto-complete method for spoken complete value entries, according to various embodiments.

Referring now to FIG. 5, according various embodiments, the auto-complete method 100 for spoken complete value entries comprises collecting one or more possible complete value entries (step 105). The possible complete value entries may be collected from common responses defined by the user or system 10, (verbal) responses expected to be received from the user in a particular context (e.g., the workflow process, the least one workflow stage, and/or the particular task being performed by the user. The possible complete value entries can be based on other options. The possible complete value entries may be stored in the memory of the server or the memory of the mobile computing device and used to form a suggestion list for purposes as hereinafter described. The collection of one or more possible value entries may be performed at any time prior to receiving the possible complete value entry (step 110) as hereinafter described. It is be understood that the collection of the one or more possible value entries may only need to be performed once with the suggestion list prepared therefrom as hereinafter described used multiple times.

In the context a performing a workflow process, when the host system (server) sends down the voice assignment, it can optionally send the list of possible responses (or expected responses) to the mobile device.

Still referring to FIG. 5, according to various embodiments, the auto-complete method 100 for spoken complete value entries comprises receiving a possible complete value entry having a unique subset (step 110). The processor 90 of the mobile computing device 70 is configured to receive the possible complete long value entry having the unique subset from the server 12 or elsewhere (e.g., its own memory). Receiving a possible complete value entry comprises receiving the one or more possible complete value entries in the suggestion list. Each of the possible complete value entries has a unique subset configured to match with a particular spoken subset as hereinafter described. The unique subset is a predetermined portion of the possible complete value entry. The number of characters in a unique subset is less than the number of characters in the possible complete value entry. The unique subsets of the possible complete value entries may be stored in the memory of the server or the memory of the mobile computing device.

For example only, the user may be assigned the task of inspecting vehicles in a workflow process. Prior to each vehicle inspection, the user may be prompted to speak the vehicle identification number (VIN) of the particular vehicle. In this exemplary context, the vehicle identification number of each of the vehicles to be inspected may be considered exemplary expected responses to be received in the context of the particular workflow process, the at least one workflow stage, and/or the particular task being performed by the user. The vehicle identification numbers may thus be possible complete value entries in the suggestion list.

Still referring to FIG. 5, according to various embodiments, the auto-complete method 100 for spoken complete value entries comprises prompting a user to speak a spoken complete value entry (step 120). The processor of the mobile computing device is configured to prompt the user to speak the complete value entry. For example, the server 12 transmits task messages or task instructions to the mobile computing device 70 to perform a task. The processor 90 of the mobile computing device 70 receives the task messages or task instructions from the server 12 and prompts the user for a spoken complete value entry. While task messages and task instructions have been described as possible preludes for a spoken complete value entry from the user, it is to be understood that the processor 90 of the mobile computing device 70 may prompt the user for a spoken complete value entry that does not involve a task at all. For example, a prompt may be for a credit card number, a phone number, a VIN, etc.

Still referring to FIG. 5, according to various embodiments, the auto-complete method 100 for spoken complete value entries comprises receiving a spoken subset of the spoken complete value entry (step 130). When prompted for the spoken complete value entry (step 120), the user begins speaking the complete value entry (i.e., the string of characters that make up the complete value entry). The processor of the mobile computing device receives the spoken subset from the headset when the user speaks into the one or more microphones of the headset. The spoken subset comprises a predetermined minimum number of characters of the complete value entry. The number of characters in a spoken complete value entry is greater than the number of characters in the spoken subset thereof. The predetermined minimum of characters (i.e., the spoken subset) comprises one or more sequential characters in the string of characters of the spoken complete long value. The predetermined minimum number of characters in the spoken subset may be (pre)determined in order to differentiate between possible complete value entries having at least one common character. For example, the suggestion list of possible complete value entries may include the following three possible complete value entries: 1234567890222222222, 1245678903111111111, 1345678900200000000. In this example, as two of the possible complete value entries share the first characters 1 and 2, the predetermined minimum of characters of the spoken subset may be three. The predetermined number of characters may be selected in a field provided by the prediction software program.

Still referring to FIG. 5, according to various embodiments, the auto-complete method 100 for spoken complete value entries comprises comparing the spoken subset with the unique subset of the possible complete value entry (step 140). The processor of the mobile computing device compares the spoken subset with the unique subset of the possible complete value entry. After the predetermined minimum number of characters (i.e., the spoken subset) has been spoken by the user, the processor compares the spoken subset against the possible complete value entries in the suggestion list. More particularly, the processor, configured by the prediction software program, compares the spoken subset against the unique subset of each of the possible complete value entries. The prediction software program predicts the spoken complete value entry that a user intends to speak after only the predetermined minimum number of characters (i.e., the spoken subset) has been spoken by the user. The prediction software program predicts the complete value entry by matching the spoken subset with the unique subset of the one or more possible complete value entries. It is to be understood that the greater the predetermined number of characters in the spoken subset (and in the unique subset), the suggestion of the spoken complete value entry is more apt to be correct. The complete value entry is the possible complete value entry having the unique subset that matches (i.e., is the same as) the spoken subset of the complete value entry. The unique subset and the spoken subset "match" by having the same characters, in the same order, and in the same position, i.e., the unique subset and the spoken subset are identical.

Still referring to FIG. 5, according to various embodiments, the auto-complete method 100 for spoken complete value entries comprises automatically completing the spoken complete value entry (step 150). The spoken complete value entry is automatically completed (an "automatically completed spoken complete value entry") to match the possible complete value entry if the possible complete value entry having the unique subset that matches the spoken subset is included in the suggestion list and the unique subset thereof matches the spoken subset. If the spoken subset that the user speaks does not match the unique subset at least one of the possible complete value entries on the suggestion list, the processor may alert the user that the spoken subset may be incorrect.

Still referring to FIG. 5, according to various embodiments, the auto-complete method 100 for spoken complete value entries continues by confirming the auto-completed spoken complete value entry with the user (i.e., that the auto-completed spoken complete value entry matches the spoken complete value entry that the user intended to speak when prompted in step 120) (step 160). The auto-completed spoken complete value entry is a suggestion for the spoken complete value entry. The processor of the mobile computing device confirms the auto-completed spoken complete value entry by speaking back the spoken complete value entry. After the mobile computing device (more particularly, the processor thereof) speaks back the auto-completed spoken complete value entry, the mobile computing device may ask the user for user confirmation that the suggestion (the auto-completed spoken complete value entry as spoken back by the mobile computing device) is correct.

The user may accept or decline the suggestion. The user may accept or decline the suggestion in a number of ways (e.g., by the graphical user interface). If the suggestion is accepted, the auto-complete method 100 for a spoken complete value entry ends. More specifically, the mobile computing device may send a signal to the server 12 that the auto-completed spoken complete value entry has been confirmed. The server 12 (more particularly, the business logic application thereof) may then repeat method 100 for another spoken complete value entry.

If the suggestion is declined by the user, at least the comparing and automatically completing steps may be repeated until the user accepts the suggestion. According to various embodiments, if the suggestion is declined by the user (i.e., the user does not confirm the automatically completed spoken complete value entry as the spoken complete value entry), the method further comprises removing the possible complete value entry from the suggestion list so it will not be used again to (incorrectly) automatically complete the spoken value entry (step 170).

If the suggestion is neither accepted nor declined, the processor 90 may be further configured to generate and transmit to the user 76 an alert. The alert may comprise an audible sound, a visual indication, or the like. Additionally, or alternatively, the business logic application may stop until the suggestion is accepted or declined (e.g., the server may discontinue sending task messages and task instructions until the suggestion is accepted or declined).

Based on the foregoing, it is to be appreciated that various embodiments provide auto-correct methods for spoken complete value entries. Various embodiments speed up human-computer interactions. Various embodiments as described herein are especially useful for spoken long value entries and for use in workflow processes, improving workflow efficiencies and easing worker frustration.

A person having ordinary skill in the art will recognize that the environments illustrated in FIGS. 1 through 4 are not intended to limit the scope of various embodiments of the present invention. In particular, the server 12 and the mobile computing system 16 may include fewer or additional components, or alternative configurations, consistent with alternative embodiments of the present invention. Thus, a person having skill in the art will recognize that other alternative hardware and/or software environments may be used without departing from the scope of the present. For example, a person having ordinary skill in the art will appreciate that the server 12 and mobile computing system 16 may include more or fewer applications disposed therein. As such, other alternative hardware and software environments may be used without departing from the scope of embodiments of the present. Moreover, a person having ordinary skill in the art will appreciate that the terminology used to describe various pieces of data, task messages, task instructions, voice dialogs, speech output, speech input, and machine readable input are merely used for purposes of differentiation and are not intended to be limiting. The routines executed to implement the embodiments of the present invention, whether implemented as part of an operating system or a specific application, component, program, object, module or sequence of instructions executed by one or more computing systems will be referred to herein as a "sequence of operations," a "program product," or, more simply, "program code." The program code typically comprises one or more instructions that are resident at various times in various memory and storage devices in a computing system (e.g., the server 12 and/or mobile computing system 16), and that, when read and executed by one or more processors of the mobile computing system, cause that computing system to perform the steps necessary to execute steps, elements, and/or blocks embodying the various aspects of the present.

While the present invention has and hereinafter will be described in the context of fully functioning computing systems, those skilled in the art will appreciate that the various embodiments of the present are capable of being distributed as a program product in a variety of forms, and that the present applies equally regardless of the particular type of computer readable media used to actually carry out the distribution. Examples of computer readable media include but are not limited to physical and tangible recordable type media such as volatile and nonvolatile memory devices, floppy and other removable disks, hard disk drives, optical disks (e.g., CD-ROM's, DVD's, Blu-Ray disks, etc.), among others. In addition, various program code described hereinafter may be identified based upon the application or software component within which it is implemented in a specific embodiment of the present. However, it should be appreciated that any particular program nomenclature that follows is used merely for convenience, and thus the present should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the present is not limited to the specific organization and allocation of program functionality described herein.

* * *

To supplement the present disclosure, this application incorporates entirely by reference the following commonly assigned patents, patent application publications, and patent applications:

U.S. Pat. Nos. 6,832,725; 7,128,266; 7,159,783; 7,413,127; 7,726,575; 8,294,969; 8,317,105; 8,322,622; 8,366,005; 8,371,507; 8,376,233; 8,381,979; 8,390,909; 8,408,464; 8,408,468; 8,408,469; 8,424,768; 8,448,863; 8,457,013; 8,459,557; 8,469,272; 8,474,712; 8,479,992; 8,490,877; 8,517,271; 8,523,076; 8,528,818; 8,544,737; 8,548,242; 8,548,420; 8,550,335; 8,550,354; 8,550,357; 8,556,174; 8,556,176; 8,556,177; 8,559,767; 8,599,957; 8,561,895; 8,561,903; 8,561,905; 8,565,107; 8,571,307; 8,579,200; 8,583,924; 8,584,945; 8,587,595; 8,587,697; 8,588,869; 8,590,789; 8,596,539; 8,596,542; 8,596,543; 8,599,271; 8,599,957; 8,600,158; 8,600,167; 8,602,309; 8,608,053; 8,608,071; 8,611,309; 8,615,487; 8,616,454; 8,621,123; 8,622,303; 8,628,013; 8,628,015; 8,628,016; 8,629,926; 8,630,491; 8,635,309; 8,636,200; 8,636,212; 8,636,215; 8,636,224; 8,638,806; 8,640,958; 8,640,960; 8,643,717; 8,646,692; 8,646,694; 8,657,200; 8,659,397; 8,668,149; 8,678,285; 8,678,286; 8,682,077; 8,687,282; 8,692,927; 8,695,880; 8,698,949; 8,717,494; 8,717,494; 8,720,783; 8,723,804; 8,723,904; 8,727,223; 8,702,237; 8,740,082; 8,740,085; 8,746,563; 8,750,445; 8,752,766; 8,756,059; 8,757,495; 8,760,563; 8,763,909; 8,777,108; 8,777,109; 8,779,898; 8,781,520; 8,783,573; 8,789,757; 8,789,758; 8,789,759; 8,794,520; 8,794,522; 8,794,525; 8,794,526; 8,798,367; 8,807,431; 8,807,432; 8,820,630; 8,822,848; 8,824,692; 8,824,696; 8,842,849; 8,844,822; 8,844,823; 8,849,019; 8,851,383; 8,854,633; 8,866,963; 8,868,421; 8,868,519; 8,868,802; 8,868,803; 8,870,074; 8,879,639; 8,880,426; 8,881,983; 8,881,987; 8,903,172; 8,908,995; 8,910,870; 8,910,875; 8,914,290; 8,914,788; 8,915,439; 8,915,444; 8,916,789; 8,918,250; 8,918,564; 8,925,818; 8,939,374; 8,942,480; 8,944,313; 8,944,327; 8,944,332; 8,950,678; 8,967,468; 8,971,346; 8,976,030; 8,976,368; 8,978,981; 8,978,983; 8,978,984; 8,985,456; 8,985,457; 8,985,459; 8,985,461; 8,988,578; 8,988,590; 8,991,704; 8,996,194; 8,996,384; 9,002,641; 9,007,368; 9,010,641; 9,015,513; 9,016,576; 9,022,288; 9,030,964; 9,033,240; 9,033,242; 9,036,054; 9,037,344; 9,038,911; 9,038,915; 9,047,098; 9,047,359; 9,047,420; 9,047,525; 9,047,531; 9,053,055; 9,053,378; 9,053,380; 9,058,526; 9,064,165; 9,064,167; 9,064,168; 9,064,254; 9,066,032; 9,070,032;

U.S. Design Patent No. D716,285;
U.S. Design Patent No. D723,560;
U.S. Design Patent No. D730,357;
U.S. Design Patent No. D730,901;
U.S. Design Patent No. D730,902;
U.S. Design Patent No. D733,112;

U.S. Design Patent No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;

U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTIPURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILE-PHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);
U.S. patent application Ser. No. 14/339,708 for LASER SCANNING CODE SYMBOL READING SYSTEM, filed Jul. 24, 2014 (Xian et al.);
U.S. patent application Ser. No. 14/340,627 for an AXIALLY REINFORCED FLEXIBLE SCAN ELEMENT, filed Jul. 25, 2014 (Rueblinger et al.);
U.S. patent application Ser. No. 14/446,391 for MULTIFUNCTION POINT OF SALE APPARATUS WITH OPTICAL SIGNATURE CAPTURE filed Jul. 30, 2014 (Good et al.);
U.S. patent application Ser. No. 14/452,697 for INTERACTIVE INDICIA READER, filed Aug. 6, 2014 (Todeschini);
U.S. patent application Ser. No. 14/453,019 for DIMENSIONING SYSTEM WITH GUIDED ALIGNMENT, filed Aug. 6, 2014 (Li et al.);
U.S. patent application Ser. No. 14/462,801 for MOBILE COMPUTING DEVICE WITH DATA COGNITION SOFTWARE, filed on Aug. 19, 2014 (Todeschini et al.);
U.S. patent application Ser. No. 14/483,056 for VARIABLE DEPTH OF FIELD BARCODE SCANNER filed Sep. 10, 2014 (McCloskey et al.);
U.S. patent application Ser. No. 14/513,808 for IDENTIFYING INVENTORY ITEMS IN A STORAGE FACILITY filed Oct. 14, 2014 (Singel et al.);
U.S. patent application Ser. No. 14/519,195 for HAND-HELD DIMENSIONING SYSTEM WITH FEEDBACK filed Oct. 21, 2014 (Laffargue et al.);
U.S. patent application Ser. No. 14/519,179 for DIMENSIONING SYSTEM WITH MULTIPATH INTERFERENCE MITIGATION filed Oct. 21, 2014 (Thuries et al.);
U.S. patent application Ser. No. 14/519,211 for SYSTEM AND METHOD FOR DIMENSIONING filed Oct. 21, 2014 (Ackley et al.);

U.S. patent application Ser. No. 14/519,233 for HANDHELD DIMENSIONER WITH DATA-QUALITY INDICATION filed Oct. 21, 2014 (Laffargue et al.);

U.S. patent application Ser. No. 14/519,249 for HANDHELD DIMENSIONING SYSTEM WITH MEASUREMENT-CONFORMANCE FEEDBACK filed Oct. 21, 2014 (Ackley et al.);

U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);

U.S. patent application Ser. No. 14/529,563 for ADAPTABLE INTERFACE FOR A MOBILE COMPUTING DEVICE filed Oct. 31, 2014 (Schoon et al.);

U.S. patent application Ser. No. 14/529,857 for BARCODE READER WITH SECURITY FEATURES filed Oct. 31, 2014 (Todeschini et al.);

U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);

U.S. patent application Ser. No. 14/531,154 for DIRECTING AN INSPECTOR THROUGH AN INSPECTION filed Nov. 3, 2014 (Miller et al.);

U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTOCONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGUMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

\* \* \*

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. An auto-complete method comprising:
displaying a request for information adjacent to a graphical input field;
in response to displaying the request for information, receiving from a user, via a microphone, a spoken response comprising a set of spoken language characters, wherein the spoken response is associated with the request for information;
translating a subset of the set of spoken language characters into a set of written characters to create a set of translated written characters associated with the spoken response;
displaying the set of translated written characters in the graphical input field;
comparing the set of translated written characters to a collection of sets of written characters to determine whether the set of translated written characters matches a portion of the collection of sets of written characters; and
in response to matching the set of translated written characters to a first portion of a first set of written characters of the collection of sets of written characters, displaying a second portion that is a remainder of the first set of written characters as appended to the set of translated written characters displayed in the graphical input field.

2. The auto-complete method of claim 1, wherein the second portion is displayed in a first format, and the set of translated written characters is displayed in a second format different from the first format.

3. The auto-complete method of claim 2, wherein the first format is associated with a first text color, and the second format is associated with a second text color.

4. The auto-complete method according to claim 1, further comprising receiving a list of the collection of sets of written characters wherein each set of written characters in the collection of sets of written characters includes a unique subset of characters.

5. The auto-complete method according to claim 4, further comprising receiving the collection of sets of written characters based on collecting sets of written characters from at least one of common responses and responses expected to be received from the user in a particular context.

6. The auto-complete method according to claim 1, further comprising transmitting an alert if the set of translated written characters does not match the portion of the collection of sets of written characters.

7. The auto-complete method according to claim 1, further comprising prompting the user to confirm an automatically completed subset of spoken language characters as the information, after the second portion that is the remainder of the first set of written characters as appended to the set of translated written characters is displayed in the graphical input field.

8. The auto-complete method according to claim 7, wherein prompting the user to confirm the automatically completed subset of spoken language characters comprises reading back the automatically completed subset of spoken language characters by the user.

9. The auto-complete method according to claim 1, further comprising:
displaying, in the graphical input field, the second portion that is the remainder of the first set of written characters as a suggestion; and
receiving at least one of a user acceptance or user declination of the suggestion.

10. The auto-complete method according to claim 9, further comprising: upon receiving the user declination repeating, in order, at least comparing the set of translated written characters to the collection of sets of written characters to determine whether the set of translated written characters matches the portion of the collection of sets of written characters; in response to matching the set of translated written characters to another portion of another set of written characters of the collection of sets of written characters, displaying another portion that is a remainder of the another set of written characters as appended to the set of translated written characters displayed in the graphical input field; and removing the first set of written characters from a suggestion list.

11. An auto-complete method comprising:
receiving, via a microphone, a spoken response, comprising a set of spoken language characters, wherein the spoken response is associated with a request for information displayed in a graphical input field that is visible to a user;
translating a subset of the set of spoken language characters into a set of written characters to create a set of translated written characters associated with the spoken response, wherein the set of translated written characters are adapted to be displayed in the graphical input field to the user;
determining the set of translated written characters to match with a portion of, at least, a set from amongst a collection of sets of written characters; and
in response to the matching of the set of translated written characters to a first portion of a first set of written characters of the collection of sets of written characters, automatically completing the subset of the set of spoken language characters to match the information, by appending to the set of translated written characters, a second portion that is a remainder of the first set of written characters.

12. The auto-complete method according to claim 11, further comprising displaying the second portion that is the remainder of the first set of written characters as appended to the set of translated written characters in the graphical input field.

13. The auto-complete method of claim 11, further comprising receiving the collection of sets of written characters based on collecting sets of written characters from at least one of common responses and responses expected to be received from the user in a particular context and wherein each set of written characters in the collection of sets of written characters includes a unique subset of characters.

14. The auto-complete method of claim 11, wherein the second portion is displayed in a first format, and the set of translated written characters is displayed in a second format different from the first format and wherein the first format is associated with a first text color, and the second format is associated with a second text color.

15. The auto-complete method of claim 11, further comprising transmitting an alert if the set of translated written characters does not match the first portion of the first set of written characters of the collection of sets of written characters.

16. The auto-complete method according to claim 11, further comprising prompting the user to confirm the automatically completed the subset of the set of spoken language characters as the information based on one of:
  reading back the automatically completed the subset of the set of spoken language characters by the user; or
  an input provided by the user on an input interface associated with the graphical input field.

17. A system, comprising:
  one or more processors configured to:
    cause a display screen to display a task instruction, wherein the task instruction is configured to prompt a request to a user to speak an information;
    receive a spoken response from a microphone, wherein the spoken response comprises a set of spoken language characters;
    translate a subset of the set of spoken language characters to a set of written characters to create a set of translated written characters associated with the spoken response;
    display the set of translated written characters in a graphical input field of the display screen;
    compare the set of translated written characters to a collection of sets of written characters to determine whether the set of translated written characters matches a portion of the collection of sets of written characters;
    determine, based on the comparison of the set of translated written characters to the collection of sets of written characters, that the translated subset of the set of spoken language characters matches with a subset of characters from a set of characters, wherein the subset of characters represents a possible complete value entry from amongst a set of possible complete value entries; and
    in response to matching the set of translated written characters to a first portion of a first set of written characters of the collection of sets of written characters, cause to display a second portion that is a remainder of the first set of written characters as appended to the set of translated written characters displayed in the graphical input field of the display screen.

18. The system of claim 17, wherein the one or more processors are configured to:
  cause the second portion to be displayed in a first format and the set of translated written characters is displayed in a second format different from the first format and wherein the first format is associated with a first text color, and the second format is associated with a second text color.

19. The system of claim 17, wherein the one or more processors are configured to:
  generate and transmit an alert if the set of translated written characters does not match the first portion of the first set of written characters of the collection of sets of written characters.

20. The system of claim 17, wherein the one or more processors are configured to:
  cause to display the second portion, on the graphical input field, that is the remainder of the first set of written characters as a suggestion;
  receive one of a user acceptance or user refusal of the suggestion;
  upon receiving the user acceptance, continue to cause the display of the second portion that is the remainder of the first set of written characters as appended to the set of translated written characters displayed in the graphical input field of the display screen; and
  upon receiving the user refusal of the suggestion, cause to repeat, in order, at least compare the set of translated written characters to the collection of sets of written characters to determine whether the set of translated written characters matches the portion of the collection of sets of written characters; in response to matching the set of translated written characters to another portion of another set of written characters of the collection of sets of written characters, cause to display another portion that is the remainder of the first set of written characters as appended to the set of translated written characters displayed in the graphical input field of the display screen and remove the first set of written characters from a suggestion list.

* * * * *